United States Patent [19]

Lewis et al.

[11] 4,288,568

[45] Sep. 8, 1981

[54] ELASTOMERS CONTAINING CHEMICALLY BONDED METAL ATOMS

[75] Inventors: Kenneth W. Lewis, Westminster; Robert C. Shaffer, Playa del Ray, both of Calif.

[73] Assignee: Hitco, Irving, Calif.

[21] Appl. No.: 173,453

[22] Filed: Jul. 30, 1980

[51] Int. Cl.³ ............................................. C08L 63/00
[52] U.S. Cl. ................................... 525/111; 525/113
[58] Field of Search ................................ 525/111, 113

[56] References Cited

U.S. PATENT DOCUMENTS 3,544,530 12/1970 Shaffer .............................. 526/270
4,087,482 5/1978 Shaffer .............................. 526/445
4,185,043 1/1980 Shaffer .............................. 525/361

Primary Examiner—Paul Lieberman
Attorney, Agent, or Firm—Roylance, Abrams, Berdo & Farley

[57] ABSTRACT

An elastomer containing chemically bonded metal atoms is prepared by reacting a diene elastomer such as a nitrile rubber with the reaction product of an epoxy resin and a metal containing polymer. The metal containing polymer is prepared by reacting a polycarboxylic acid and a metal complex which is a reaction product of tungsten carbonyl and/or molybdenum carbonyl with pyrrolidine.

13 Claims, No Drawings

ELASTOMERS CONTAINING CHEMICALLY BONDED METAL ATOMS

BACKGROUND OF THE INVENTION

1. Field of the Invention

This invention relates to thermosetting elastomers which incorporate metal atoms. More particularly, this invention relates to elastomers containing atomically dispersed metal atoms.

2. Description of the Prior Art

U.S. Pat. No. 4,087,482 to Robert C. Shaffer, discloses furfuryl alcohol copolymers of a polyester prepolymer of maleic acid or anhydride and a polyhydric alcohol which incorporate tungsten and/or molybdenum metal atoms. The metal atoms are incorporated into the copolymers by reacting the polyester prepolymer with a reaction product of tungsten or molybdenum carbonyl and pyrrolidine.

U.S. Pat. No. 4,185,043 to Robert C. Shaffer and U.S. application Ser. No. 06/084, filed Oct. 12, 1979, disclose thermoplastic and thermosetting polymers which incorporate tungsten and/or molybdenum metal atoms. The metal atoms are incorporated into the polymer by reacting a monomer or polymer containing at least one free carboxyl group with a reaction product of tungsten or molybdenum carbonyl and pyrrolidine to obtain a polymer which may then be reacted with a copolymer such as an epoxy resin.

SUMMARY OF THE INVENTION

It has been discovered that the properties of a copolymer rubber or elastomer may be improved by incorporating therein at least one metal selected from the group consisting of tungsten and molybdenum. The terms "rubber" and "elastomer" are used interchangeably herein. The metal is atomically dispersed within the copolymer rubber by being chemically bonded in the primary polymer chain. In accordance with the present invention, a metal complex is prepared which is a reaction product of tungsten carbonyl and/or molybdenum carbonyl with pyrrolidine. This metal complex is reacted with a polycarboxylic acid to form a polymer with the metal atoms chemically bonded in the polymer chain. This polymer is reacted with an epoxy resin and the reaction product is then copolymerized with a diene elastomer, preferably a nitrile rubber. The presence of the metal atoms within the resin molecule affords the rubber a new dimension in performance capability. This metal bearing rubber is capable of absorbing large amounts of energy while maintaining comparable physical performance characteristics of carbon loaded, non-metal bearing rubbers. This material has been found to be resistant to high speed pebble impact and high velocity dust erosion. Further, it has a very low level of thermal conductivity when compared to values of carbon loaded, non-metal bearing rubbers. These properties enable the rubber of this invention to be used as energy shielding with heat insulating properties, as well as a physical barrier to mechanical damage incurred when high speed vehicles travel through hostile environments.

DESCRIPTION OF THE PREFERRED EMBODIMENTS

In order to prepare the metal containing elastomers of this invention, a complex is first prepared by reacting tungsten carbonyl or molybdenum carbonyl, with pyrrolidine. The reaction between the metal carbonyl and pyrrolidine may be accomplished in one of several methods found in the literature, e.g., an article by Fowles et al entitled "The Reactions of Group VI Metal Carbonyls with Pyrrolidine, Piperazine, and Morpholine," *Inorganic Chemistry*, Vol. 3, No. 2, Feb. 1964, pages 257–259. The reaction product consisting of the pyrrolidine - metal carbonyl complex is ground to a fine powder for subsequent reaction.

The reaction product consisting of the pyrrolidine - metal carbonyl complex is believed to contain at least two moles of pyrrolidine to one mole of carbonyl. The complex is reactive with carboxyl groups.

The polycarboxylic acid which is reacted with the pyrrolidine - metal carbonyl complex may be either a saturated or an ethylenically unsaturated polycarboxylic acid. Examples of such acids include phthalic acid, phthalic anhydride, succinic acid, adipic acid, sebacic acid, isophthalic acid, terephthalic acid, maleic acid, maleic anhydride, fumaric acid, itaconic acid, etc.

The polycarboxylic acid which is reacted with the pyrrolidine - metal carbonyl complex may also be a polyester prepolymer which contains free carboxyl groups. Such polyester prepolymers may be prepared by methods well known in the art by reacting a dicarboxylic acid or anhydride, such as one of those set forth in the preceding paragraph, with a polyhydroxy compound. Polyhydroxy compounds which may be utilized in preparing the prepolymers are polyols having the general formula:

$$R—(OH)_n$$

wherein n is an integer between 2 and 4 and wherein R is a hydrocarbon group containing between 2 and about 20 carbon atoms. Other suitable materials include polyoxyalkylene glycols or polyalkylene glycol ethers of the general formula:

$$HO(R'O)_mH$$

wherein R' is an alkyl group of between about 2 and about 4 carbon atoms and wherein m is an integer of at least 2. Specific polyols which may be utilized include ethylene glycol, diethylene glycol, triethylene glycol, trimethylene glycol, tetraethylene glycol, 1,5-pentane diol, tetramethylene glycol (1,4-butylene glycol), 1,8-octane diol, glycerol, pentaerythritol, xylene glycol, polyoxyethylene glycol and polyoxypropylene glycol. Preferred mononuclear aromatic polyols are the polyhydric phenols such as hyroquinone, resorcinol and the like. The polyester prepolymers are preferably prepared by reacting at least a slight stoichiometric excess of the polycarboxylic acid with a polyhydric alcohol. Such polyester prepolymers are of relatively short chain length as compared to those wherein an excess of alcohol is used. The excess acid results in prepolymers characterized by fewer ester linkages and containing sufficient terminal acid groups to permit reaction of the polyester prepolymer with the reaction product of pyrrolidine and metal carbonyl. Such prepolymers have molecular weights typically in the range of from about 300 to about 1000.

The polycarboxylic acid is reacted with the pyrrolidine - metal carbonyl reaction product by combining the two materials and heating the reaction mixture, preferably within the range of from about 80°–260° C.

for from about 1 to 36 hours. The amount of pyrrolidine - metal carbonyl reaction product which is reacted with the carboxylic acid may vary widely. Preferably, from about 0.3 to 8 moles of polycarboxylic acid, and, more preferably from about 0.6 to 4 moles of polycarboxylic acid are reacted per mole of pyrrolidine - metal carbonyl reaction product.

The following procedures illustrate the reaction of the metal carbonyl-pyrrolidine complex with a polycarboxylic acid.

PROCEDURE I

One mole of the metal carbonyl - pyrrolidine complex is blended with one to four moles of a maleic acid - diethylene glycol polyester prepolymer prepared as described in U.S. Pat. No. 3,544,530 and heated to about 110° C. for a period of approximately one hour. This product is further heated to about 160° C. for about another hour or until the desired product is formed.

PROCEDURE II

Three moles of metal carbonyl - pyrrolidine reaction product may be reacted with 3 to 12 moles of maleic acid in a suitable solvent, e.g., N-methyl-pyrrolidinone, by heating to 230° C. for 6 hours.

The resultant polymer containing metal atoms is reacted with an epoxy resin. The epoxy resins which are suitable for use in this invention are well known in the art. An example is the diglycidyl ether of Bisphenol A, normally formed as a condensation product of epichlorohydrin and Bisphenol A (i.e., bis(4-hydroxy-phenyl)-dimethylmethane). Condensation products of epichlorohydrin with other polyhydric alcohols may also be used such as the diglycidyl ether of 4,4'-dihydroxybiphenyl. Other suitable epoxy resins include epoxidized glycerin dialiphatic esters, 1,4-bis(2,3-epoxypropoxy)benzene; 1,3-bis(2,3-epoxypropoxy)benzene; 4,4'-bis(2,3-epoxy-propoxy)diphenyl ether; 1,8-bis(2,3-epoxy-propoxy)octane; 1,4'-bis(2,3-epoxy-propoxy)cyclohexane; 4,4-bis(2-hydroxy-3,4'-epoxy-butoxy)-2-chlorocyclohexane; 1,3-bis(2-hydroxy-3,4-epoxy-butoxybenzene), 1,4-bis(2-hydroxy-4,5-epoxy-pentoxy)-benzene and epoxy-novolak resins.

The epoxy resin is reacted with the metal containing polymer by combining the two materials and heating the reaction mixture, preferably within the range of from about 60° to 130° C. for from about 0.25 to 4 hours. The amount of epoxy resin which may be reacted with the metal containing polymer may vary widely. Preferably, from about 0.8 to 16 moles of epoxy resin and, more preferably, from about 1.1 to 8 moles of epoxy resin are reacted per mole of metal containing polymer.

The following procedure illustrates the preparation of a copolymer resin by reacting the metal carbonyl - pyrrolidine complex with a polycarboxylic acid and subsequently reacting this product with an epoxy resin.

PROCEDURE III

A polyester prepolymer containing metal atoms chemically bonded in the polymer chain is prepared as described in Procedure I. This product may then be blended with 1 to 5 or more moles of epoxy resin such as one obtained by the reaction of Bisphenol A and epichlorohydrin. The mixture is heated to about 100° C. to 150° C. until the desired product is formed.

The reaction product of the epoxy resin and metal containing polymer is then reacted with a diene elastomer, preferably a nitrile rubber. Nitrile rubbers which are suitable for use in this invention are well known in the art. These are rubber like copolymers of unsaturated nitriles with dienes. The most common nitrile rubber is a copolymer of butadiene and acrylonitrile. By the addition of monomers containing other functional groups such as carboxylic acid groups or amine groups, the nitrile rubber may be provided with these other functional groups. A more complete discussion of nitrile rubbers and their preparation may be found in "Polymers and Resins, Their Chemistry and Chemical Engineering" by Brage Golding, D. Van Nostrand Company, Inc., Princeton, New Jersey (1959), pages 488–492, the disclosure of which is incorporated herein by reference.

It is preferred that the nitrile rubber be a butadiene/acrylonitrile copolymer elastomer containing reactive terminal groups, e.g., carboxylic acid groups or amine groups. The preferred acrylonitrile content in the elastomer may be varied up to 30% by weight. Higher acrylonitrile contents enhance thermal stability in the finished product.

The nitrile rubber is reacted or copolymerized with the epoxy resin modified metal containing polymer by combining the two materials and heating the reaction mixture, preferably within the range of from about 60° to 140° C. for from about 0.25 to 4 hours. The amount of nitrile rubber which is reacted with the epoxy resin modified metal containing polymer may vary widely. Preferably, from about 0.2 to 5 moles of acrylonitrile rubber are reacted per mole of epoxy resin modified metal containing polymer. The reaction product may then be cured to a thermosetting material with an amine catalyst, preferably from about 0.5 to 4 parts by weight of a tertiary amine catalyst based upon the combined weight of the nitrile rubber and epoxy resin modified metal containing polymer. The product has good energy absorbing properties, low thermal conductivity, high mechanical strength and good flexibility and toughness.

Diene elastomers not containing a nitrile moiety, e.g., a carboxyl terminated butadiene elastomer, may also be used in the practice of this invention although the heat resistance of the product is lower than a product having a significant nitrile content. A more complete disclosure of non-acrylonitrile containing diene elastomers and their preparation is contained in the aforementioned text by Brage Golding, pages 474–488 and 493–506, the disclosure of which is incorporated herein by reference.

The following example illustrates the best mode contemplated for carrying out this invention:

EXAMPLE

One mole equivalent of tungsten hexacarbonyl and an excess of pyrrolidine are reacted to form the metal pyrrolidine complex. At the completion of the reaction, the product is washed and ground to a fine powder. One mole of this finely ground product (438.1 grams) is placed into a reaction vessel with 1.4 moles of maleic acid (162.5 grams). This mixture is suspended in N-methyl-pyrrolidinone before being heated to 230° C. where the temperature is held for six hours or until the desired product is obtained. The resultant viscous, dark colored product is cooled and is then reacted with three moles of epoxy resin (1140 grams) such as the one obtained from the reaction of Bisphenol A and epichlorohydrin. The temperature is raised to 120° C. and a vacuum is applied as the system is allowed to slowly cool to 50° C. After cooling, a carboxyl terminated polybutadiene/acrylonitrile elastomer (B. F. Goodrich Hycar 1300 X-13) is added. One mole of this elastomer (3400 grams) is combined under vacuum with one mole of the epoxy resin modified metal containing polymer (1140 grams). This mixture is then heated under vacuum to 120° C., held for 15 minutes and allowed to cool to 40° C. Upon cooling, 2% by weight based upon the weight of the nitrile rubber and epoxy resin modified metal containing polymer of tris(dimethylaminomethyl) phenol is blended into the system as the temperature is raised under vacuum heating to 60° to 65° C. Castings are cured at 65° C. for 30 hours initially, with subsequent elevated post-cure cycles as indicated by final product physical requirements. The metal containing elastomer obtained in this example may be used in special application adhesives, as dust erosion resistant surface coatings, as high speed pebble impact resistant coatings and as energy absorbing insulation.

What is claimed is:

1. An elastomer containing chemically bonded metal atoms obtained by reacting a diene elastomer with the reaction product of an epoxy resin and a metal containing polymer;

said metal containing polymer having been obtained by reacting a polycarboxylic acid and a metal complex which is a reaction product of tungsten carbonyl and/or molybdenum carbonyl with pyrrolidine.

2. An elastomer as defined in claim 1 wherein said diene elastomer is a nitrile rubber.

3. An elastomer as defined in claim 2 wherein said polycarboxylic acid is a dicarboxylic acid.

4. An elastomer as defined in claim 3 wherein said dicarboxylic acid is maleic acid.

5. An elastomer as defined in claim 3 wherein said dicarboxylic acid is a condensation product of a dicarboxylic acid or anhydride and a polyhydric alcohol.

6. An elastomer as defined in claim 2 wherein said epoxy resin is obtained by the reaction of Bisphenol A and epichlorohydrin.

7. An elastomer as defined in claim 2 wherein said nitrile rubber is a copolymer of butadiene and acrylonitrile.

8. An elastomer as defined in claim 7 wherein said butadiene/acrylonitrile copolymer contains reactive terminal groups.

9. An elastomer as defined in claim 8 wherein said reactive terminal groups are carboxylic acid groups.

10. An elastomer as defined in claim 8 wherein said reactive terminal groups are amine groups.

11. An elastomer as defined in claim 7 wherein said copolymer contains up to 30% by weight of acrylonitrile.

12. An elastomer as defined in claim 7 which has been cured with an amine catalyst.

13. An elastomer as defined in claim 12 wherein said amine catalyst is a tertiary amine.

* * * * *